(12) United States Patent
Stefanov et al.

(10) Patent No.: US 11,481,691 B2
(45) Date of Patent: Oct. 25, 2022

(54) MACHINE LEARNING-BASED TEXT RECOGNITION SYSTEM WITH FINE-TUNING MODEL

(71) Applicant: Hyper Labs, Inc., New York, NY (US)

(72) Inventors: Stefan Iliev Stefanov, New York, NY (US); Boris Nikolaev Daskalov, New York, NY (US); Akhil Lohchab, New York, NY (US)

(73) Assignee: Hyper Labs, Inc., New York, NY (US)

( * ) Notice: Subject to any disclaimer, the term of this patent is extended or adjusted under 35 U.S.C. 154(b) by 0 days.

(21) Appl. No.: 16/744,550

(22) Filed: Jan. 16, 2020

(65) Prior Publication Data

US 2021/0224695 A1     Jul. 22, 2021

(51) Int. Cl.

| | |
|---|---|
| *G06N 20/20* | (2019.01) |
| *G06F 40/151* | (2020.01) |
| *G06N 3/08* | (2006.01) |
| *G06N 5/00* | (2006.01) |
| *G06V 30/40* | (2022.01) |

(52) U.S. Cl.
CPC .......... *G06N 20/20* (2019.01); *G06F 40/151* (2020.01); *G06N 3/08* (2013.01); *G06N 5/003* (2013.01); *G06V 30/40* (2022.01)

(58) Field of Classification Search
CPC .......... G06N 20/20; G06N 3/08; G06N 5/003; G06F 40/151; G06K 9/00442
See application file for complete search history.

(56) References Cited

U.S. PATENT DOCUMENTS

| | | | |
|---|---|---|---|
| 7,478,088 | B2 | 1/2009 | Summerlin et al. |
| 8,566,349 | B2 | 10/2013 | Ragnet et al. |
| 8,655,819 | B1 | 2/2014 | Burkard et al. |
| 8,744,171 | B1 | 6/2014 | Smith et al. |
| 8,897,563 | B1 | 11/2014 | Welling et al. |
| 9,141,607 | B1 | 9/2015 | Lee et al. |
| 9,305,226 | B1 | 4/2016 | Yuan et al. |
| 9,384,423 | B2 | 7/2016 | Rodriguez-Serrano et al. |

(Continued)

FOREIGN PATENT DOCUMENTS

| | | |
|---|---|---|
| CN | 107909101 A | 4/2018 |
| WO | WO-2021146524 A1 | 7/2021 |

OTHER PUBLICATIONS

Granet et al, "Transfer Learning for Handwriting Recognition on Historical Documents", 2018, Science and Technology Publications, all pages (Year: 2018).*

(Continued)

*Primary Examiner* — Daniel C Puentes
(74) *Attorney, Agent, or Firm* — Cooley LLP

(57) ABSTRACT

A non-transitory processor-readable medium stores instructions to be executed by a processor. The instructions cause the processor to receive a first trained machine learning model that generates a transcription based on a document. The instructions cause the processor to execute the first trained machine learning model and a second trained machine learning model to generate a refined transcription based on the transcription. The instructions cause the processor to execute a quality assurance program to generate a transcription score based on the document and the transcription. The instructions cause the processor to execute the quality assurance program to generate a refined transcription score based on the refined transcription and at least one of the document or the transcription. The at least one refined transcription score indicates an automation performance better than an automation performance for the at least one transcription score.

20 Claims, 4 Drawing Sheets

(56) References Cited

U.S. PATENT DOCUMENTS

| | | | |
|---|---|---|---|
| 9,785,855 | B2 | 10/2017 | Gordo Soldevila et al. |
| 9,798,943 | B2 | 10/2017 | Collet et al. |
| 9,847,974 | B2 | 12/2017 | Kompalli et al. |
| 9,911,033 | B1 | 3/2018 | Harary et al. |
| 2015/0169212 | A1* | 6/2015 | Chang ............... G06F 3/04883 715/780 |
| 2017/0083785 | A1 | 3/2017 | Warsawski et al. |
| 2017/0169103 | A1 | 6/2017 | Juneja et al. |
| 2018/0005082 | A1 | 1/2018 | Bluche |
| 2019/0180154 | A1 | 6/2019 | Orlov et al. |
| 2019/0311227 | A1 | 10/2019 | Kriegman et al. |
| 2020/0101710 | A1* | 4/2020 | Clausi ................... E04F 15/105 |
| 2020/0104710 | A1* | 4/2020 | Vasudevan ........... G06N 3/0454 |
| 2021/0216831 | A1* | 7/2021 | Ben-Itzhak .......... G06K 9/6268 |

OTHER PUBLICATIONS

Granet et al, "Transfer Learning for Handriting Recognition on Historical Documents", 2018, Science and Technology Publications, all pages (Year: 2018).*

Beniwal et al, "Classification and Feature Selection Techniques in Data Mining", 2012, IJERT, vol. 1 Issue 6 (Year: 2012).*

Hashemian et al, "A privacy-preserving distributed transfer learning in activity recognition", Feb. 7, 2019, Springer, all pages (Year: 2019).*

Sulistiyo et al, "Optical Character Recognition Using Modified Direction Feature and Nested Multi Layer Perceptrons Network", 2012, IEEE Xplore, all pages (Year: 2012).*

[Author Unknown] FAQs For OCR Based Data Extraction, Aug. 7, 2019, https://infrrd.ai/faqs-ocr-based-data-extraction, accessed Feb. 24, 2020, 12 pages.

Cai, et al., "TH-GAN: Generative Adversarial Network Based Transfer Learning for Historical Chinese Character Recognition". 2019 International Conference on Document Analysis and Recognition (ICDAR), IEEE, Sep. 20, 2019 (Sep. 20, 2019), pp. 178-183, XP033701417, DOI: 10.1109/ICDAR.2019.00037.

Carbonell, et al., "End-to-End Handwritten Text Detection and Transcription in Full Pages". 2019 International Conference on Document Analysis and Recognition Workshops (ICDARW), IEEE, vol. 5, Sep. 22, 2019 (Sep. 22, 2019), pp. 29-34, XP033649144, DOI: 10.1109/ICDARW.2019.40077.

International Search Report and Written Opinion for International Application No. PCT/US2021/013580, dated May 6, 2021, 13 pages.

* cited by examiner

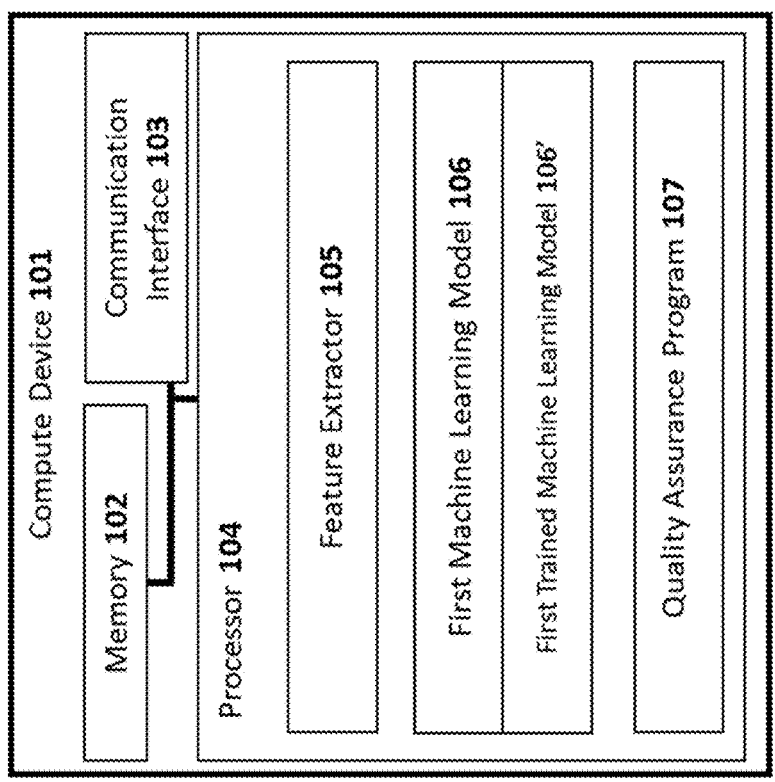
FIG. 1

MACHINE LEARNING-BASED TEXT RECOGNITION SYSTEM WITH FINE-TUNING MODEL

TECHNICAL FIELD

The present disclosure relates to the field of artificial intelligence/machine learning, and in particular to methods and apparatus for training and using a fine tuned machine learning model for refining text recognition in a document.

BACKGROUND

Various forms of written communications have been used for thousands of years, and are still in use today. Automated transcription of written communications is useful in many applications, for a number of reasons. For example, automated transcription can convert a handwritten transcription to an editable document on a compute device. Moreover, a transcribed document is known to be advantageously searchable to find information on the document faster. Thus, a need exists for new and improved methods and apparatus to efficiently and reliably transcribe written communications.

SUMMARY

In some embodiments, a non-transitory processor-readable medium stores code that represents instructions to be executed by a processor of a first compute device. The code includes code to cause the processor to receive, from a second compute device remote from the first compute device, a first trained machine learning model generates at least one transcription based on at least one document. The code includes code to cause the processor to execute the first trained machine learning model and a second trained machine learning model to generate at least one refined transcription based on the at least one transcription. The code includes code to cause the processor to execute a quality assurance program to generate at least one transcription confidence score based on the at least one document and the at least one transcription. The code includes code to cause the processor to execute the quality assurance program to generate at least one refined transcription confidence score based on the at least one refined transcription and at least one of the at least one document or the at least one transcription. The at least one refined transcription confidence score indicates an automation performance better than an automation performance for the at least one transcription confidence score.

BRIEF DESCRIPTION OF THE DRAWINGS

FIG. 1 is a schematic description of a system to perform text recognition, according to an embodiment.

DETAILED DESCRIPTION

Figure 2:
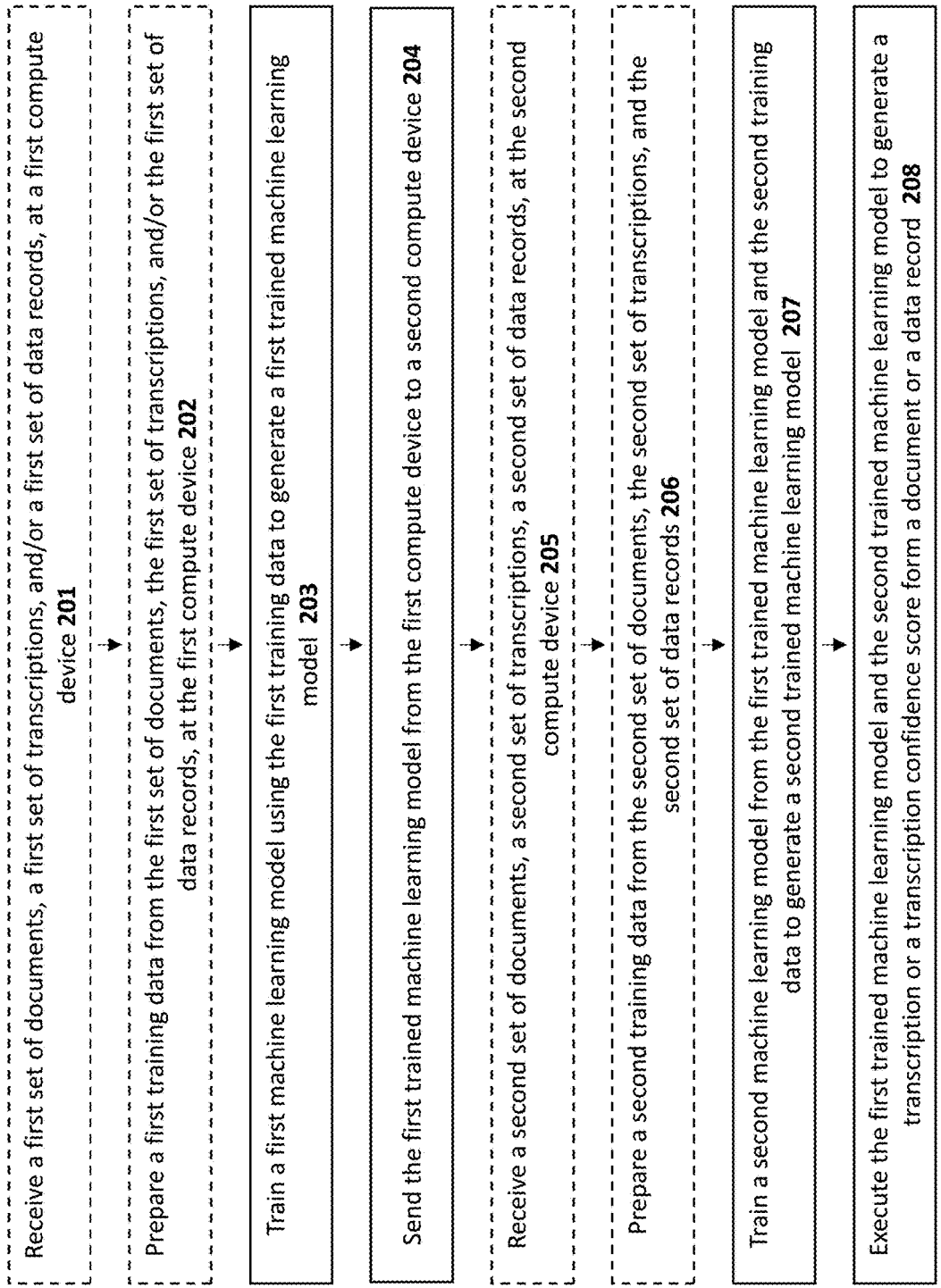
FIG. 2 is a flowchart illustrating a method to train and use a text recognition model, according to an embodiment.

Non-limiting examples of various aspects and variations of the embodiments are described herein and illustrated in the accompanying drawings.

One or more embodiments described herein generally relate to methods and systems for dynamically processing structured and semi-structured documents, and in particular, method, apparatuses, and systems that use client specific data to fine tune a pre-trained machine learning model, to increase the efficiency and reliability of machine learning text recognition systems that can reduce human supervision. Methods and systems of fine-tuned text recognition models are disclosed. In some embodiments, text recognition is vocabulary agnostic, grammar agnostic, and/or semantics agnostic, and can be used to process, for example, logographic, syllabic, alphabetic, and/or ideographic scripts.

Described herein are fine-tuned machine learning models that are suitable for highly reliable transcription systems. A fine-tuned machine learning model can be trained on user specific data and can be used with a pre-trained machine learning model. Execution of the pre-trained machine learning model with the fine-tuned model can generalize the application of the pre-trained machine learning model, initially trained on an initial development stage training data, to adapt to the domain of the user specific data.

Embodiments described herein provide methods and systems for recognizing and transcribing a document (e.g., transcribing a hand written document) or parts of a document (e.g., transcribing text added to a template form). In some instances, the text may be handwritten. In another embodiment, the text may be printed. In other instances, the text may be hand printed.

While the methods and apparatus are described herein as processing data from a set of images, a set of documents, or a set of hand-written documents, in some instances a text recognition system 100, including a compute device 101 and/or a compute device 111, as shown and described with respect to FIG. 1, can be used to generate the set of images, the set of documents, the set of hand-written documents, the set of table documents, or the set of webpages. Therefore, the text recognition system 100 can be used to generate or process any collection or stream of data, events, object, and/or artifacts. As an example, the compute device 101 can process and/or generate an artifact such as, for example, any string(s), number(s), name(s), address(es), telephone number(s), bank account number(s), social security number(s), email address(es), occupation(s), image(s), audio(s), video(s), executable file(s), dataset(s), Uniform Resource Locator (URL), device(s), device behavior(s), and/or user behavior(s). For further examples, an artifact can include a function(s) of a software code(s), a webpage(s), a data file(s), a model file(s), a source file(s), a script(s), a table(s) in a database system, a development deliverable(s), a word-processing document(s), an e-mail message(s), a text message(s), a handwritten form(s), and/or the like. As another example, the compute device 101 can process streams including, for example, a video data stream(s), an image data stream(s), an audio data stream(s), a textual data stream(s), and/or the like.

FIG. 1 is a schematic description of text recognition system 100 to perform text recognition, according to an embodiment. The text recognition system 100 can include a compute device 101 (also referred to herein as "the first compute device" and "the text recognition server device") used to generate a transcription (e.g., a transcription in form of textual data, a transcription in form of a printed document, etc.) in response to a document (e.g., an image file of a documents, a portable document file (PDF) containing typewritten as well as handwritten content, a text document, a hand-written document, a table, a webpage, and/or the like). The first compute device 101 can be connected to a compute device 111 (also referred to herein as "the second compute device" and "text recognition client device") via a network 150. The first compute device 101 and second compute device 111 each can be a hardware-based computing device and/or a multimedia device, such as, for example, a computer, a desktop, a laptop, a smartphone, a tablet, a wearable device, and/or the like.

The network 150 can be a digital telecommunication network of servers and/or compute devices. The servers and/or computes device on the network can be connected via one or more wired or wireless communication networks (not shown) to share resources such as, for example, data or computing power. The wired or wireless communication networks between servers and/or compute devices of the network 150 can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The first compute device 101 includes a memory 102, a communication interface 103, and a processor 104. The first compute device 101 can receive a first set of documents (also referred to herein as "first set of field images"), a first set of data records (also referred to herein as "first set of filed types"), or a first set of transcriptions from a first set of data sources. The first set of data sources can be, for example, a file system, a social network, a user device, a database, and/or the like. The first compute device 101 can be configured to receive the first set of documents, the first set of data records, or the first set of transcriptions from the first set of data source in response to a user of the first compute device 101 providing an indication to begin transcribing a document. In some instances, the first set of documents can also include a first set of field images that refer to parts of a document that contain a particular type of data such as, for example, a signature, a handwritten paragraph, an address, and/or the like.

The memory 102 of the first compute device 101 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 102 can store, for example, one or more software modules and/or code that includes instructions to cause the processor 104 to perform one or more processes or functions (e.g., a feature extractor 105, a first machine learning model 106, or a quality assurance program 107).

The memory 102 can store a set of files associated with (e.g., generated by executing) the first machine learning model 106 (also referred to herein as the "text recognition model"). The set of files associated with the first machine learning model 106 can include data generated by the first machine learning model 106 during the operation of the first compute device 101. For example, the set of files associated with the first machine learning model 106 can include temporary variables, return memory addresses, variables, a graph of the first machine learning model 106 (e.g., a set of arithmetic operations or a representation of the set of arithmetic operations used by the first machine learning model 106), the graph's metadata, assets (e.g., external files), electronic signatures (e.g., specifying a type of the first machine learning model 106 being exported, and the input/output tensors), and/or the like, generated during the operation of the first machine learning model 106.

The communication interface 103 of the first compute device 101 can be a hardware component of the first compute device 101 operatively coupled to the processor 104 and/or the memory 102. The communication interface 103 can be operatively coupled to and used by the processor 104. The communication interface 103 can be, for example, a network interface card (NIC), a Wi-Fi™ module, a Bluetooth® module, an optical communication module, and/or any other suitable wired and/or wireless communication interface. The communication interface 103 can be configured to connect the first compute device 101 to the network 150, as described in further detail herein. In some instances, the communication interface 103 can facilitate receiving or transmitting data via the network 150. More specifically, in some implementations, the communication interface 103 can facilitate receiving or transmitting the first set of documents, the first set of transcription, or the first set of files associated with the first machine learning model 106 through the network 150 from or to the second compute device 111, the user device, or the database, each communicatively coupled to the first compute device 101 via the network 150. In some instances, data received via communication interface 103 can be processed by the processor 104 or stored in the memory 102, as described in further detail herein.

The processor 104 can be, for example, a hardware based integrated circuit (IC) or any other suitable processing device configured to run or execute a set of instructions or a set of codes. For example, the processor 104 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 104 is operatively coupled to the memory 102 through a system bus (for example, address bus, data bus, and/or control bus, not shown).

The processor 104 can include a feature extractor 105, the first machine learning model 106 (also referred to herein as "the text recognition model"), the first trained machine learning model 106' (also referred to herein as "the trained text recognition model"), and a quality assurance program 107. Each of the feature extractor 105, the text recognition model 106, the trained text recognition model 106', or the quality assurance program 107 can be software stored in memory 102 and executed by the processor 104. For example, a code to cause the text recognition model 106 to generate a transcription from a document can be stored in memory 102 and executed by the processor 104.

Similarly, each of the feature extractor 105, the text recognition model 106, or the quality assurance program 107 can be a hardware-based device. For example, a process to cause the trained text recognition model 106' to generate the transcription from the document can be implemented on an individual IC chip.

The feature extractor 105 can be configured to receive a set of data including the first set of documents, the first set of data records, and/or the first set of transcriptions. The data can be used to train a machine learning model, for example, the text recognition model 106. The first set of documents can include, for example, images, hand-written documents, tabular documents, or webpages. The first set of data records can include, for example, a document creation date, a document edit date, a document dimension, a document file format, a document length, a document word count, a document character count, and/or any data that describe content of the first set of documents. The first set of data records can also include, for example, information about the first set of field images such as, for example, a field image creation date, a field image edit date, a field image dimension, a field image file format, a field image length, a field image word count, a field image character count, and/or any data that describe content of the first set of field images. The first set of transcriptions can include, for example, textual data in English, textual data in Spanish, and/or the like. In some implementations, the feature extractor 105 identifies and/or extracts a set of features in the set of data. The set of features can be, for example, part of a scanned image of a hand-written document, part of a string data from a transcription, and/or the like.

The feature extractor 105 can be configured further to normalize the set of features to a common scale. Normalization can also include transforming data into a common format to improve cross-compatibility of the set of data or the set of features among various modules of the first compute device 101. In one example, the feature extractor 105 can crop the set of images by using an application program interface (API) to include only parts of the set of images that include a handwritten script. In another example, the feature extractor 105 can normalize the set of transcriptions by converting the set of transcriptions using a common character encoding such as, for example, ASCII, UTF-8, UTF-16, Guobiao, Big5, Unicode, or any other suitable character encoding. In yet another example, the feature extractor 105 can receive a set of document dimensions and convert the units of the set of dimensions from the English unit such as, for example, mile, foot, inch, and/or the like, to the International System of units (SI) such as, for example, kilometer, meter, centimeter, and/or the like.

The feature extractor 105 can be configured further to resize the set of document to a common size so that each document have the same or similar dimensions before further processing (e.g., training the text recognition model 106). In one example, the feature extractor 105 can resize multiple images captured by smartphones with 640 pixels by 320 pixels resolution and multiple images captured by professional cameras with 1440 pixels by 2560 pixels, to a common size of 256 pixels by 256 pixels resolution suitable to train a deep learning model. The feature extractor 105 can be configured further to rotate the set of documents by a rotation angle so that each document have the same or similar direction alignment before further processing. In one example, multiple documents can be scanned to multiple document images such that each document image is associated with an indication of scan rotation. The feature extractor 105 can be configured to rotate each document image individually to match the indication of scan rotation and align the multiple documents. The feature extractor 105 can be configured further to convert an image of a document to an image with a standardized color depth. In one implementation, the feature extractor 105 can be configured to convert the image of the document to a binary format based on a threshold (e.g., Adaptive threshold, Otsu's threshold), an 8-bit grayscale, an 8-bit color, a 48-bit deep color, and so forth.

The text recognition model 106 can be configured to accept the set of documents or the set of data records as input to generate the set of transcriptions as output. The text recognition model 106 can be a machine learning model configured to receive the set of features or the set of data and be trained using a supervised learning algorithm or an unsupervised learning algorithm. In some instances, the text recognition model 106 can be for example, a deep learning model, a convolutional neural network model, an adversarial network model, an instance-based training model, a Bayesian network, a support vector machine, a random forest, a classifier, a k-nearest neighbor model, a decision tree, and/or the like. As such, the text recognition model 106 can be configured to include a first set of model parameters including a first set of weights, a first set of biases, and/or a first set of activation functions that once trained, can be executed to generate a first transcription from a first document and/or a first data record.

In one implementation, the text recognition model 106 can be a deep learning model that includes one or more convolutional layers. The deep learning model can be configured to have an input layer, an output layer, and multiple hidden layers (e.g., 5 layers, 10 layers, 20 layers, 50 layers, 100 layers, 200 layers, etc.). The multiple hidden layers can include normalization layers, fully connected layers, convolutional layers, activation layers, and/or any other layers that are suitable for text recognition. The deep learning model can be configured to iteratively receive each document from the first set of documents and/or each data record from the first set of data records, and generate an output. Each document from the first set of documents is associated with at least one transcription from the first set of transcriptions. Additionally, each data record from the first set of data records is associated with at least one transcription from the first set of transcriptions. The output and the transcription can be compared using a first objective function (also referred to herein as the 'first cost function') to generate a training loss. The objective function can include, for example, a mean square error, a mean absolute error, a mean absolute percentage error, a log cosh, a categorical crossentropy, and/or the like. The first set of model parameters can be modified in multiple iterations and the first objective function can be executed at each iteration of the multiple iterations until the training loss converges to a predetermined training threshold (e.g. 80%, 85%, 90%, etc.).

The first set of model parameters can then be stored as a trained text recognition model 106. The trained text recognition model 106' can be configured to generate a transcription and a transcription confidence score for a document and/or a data record. If the transcription confidence score is larger than a first confidence threshold, the transcription is acceptable and the transcription is fully automated. But if the transcription confidence is smaller than the first confidence threshold, the transcription is sent to the quality assurance program 107.

In some embodiments, the quality assurance program 107 can be configured to receive the document, the data record, the transcription, and/or the transcription confidence score from the memory 102, the text recognition model 106, the feature extractor 105, and/or the network 150. The quality assurance program 107 can be configured to display the documents, the data record, the transcription, and/or the transcription confidence score to a set of users (e.g., via a graphical user interface (not shown) of the compute device 101). Each user from the set of users can validate the transcription and/or the transcription confidence score via the quality assurance program 107. In one example, a user can check that a transcription of a letter is completely accurate while a transcription confidence score of 30% is assigned to the transcription, and submit a correction to the quality assurance program 107, which can improve future calculations of the transcription confidence score. In another example, a user can check that a transcription of a tax form is partially incorrect, and submit a correction of the transcription to the quality assurance program 107, that can improve future calculations of the transcription confidence score.

Each user from the set of users can provide a feedback via the quality assurance program 107. The set of feedbacks from the set of users can be collected and processed automatically and/or manually to generate a consensus of a corrected transcription. The consensus of the corrected transcription can be in form of a ground-truth transcription (e.g., with a 100% confidence score). The corrected transcription and/or the corrected transcription confidence score can be stored in the memory 102 and/or can be provided to the compute device 101. The corrected transcription and/or the corrected transcription confidence score can be used as training data to further train the trained text recognition model 106' to improve an accuracy and an automation rate of the trained text recognition model 106'.

The second compute device 111 includes a memory 112, a communication interface 113, and a processor 114. The second compute device 111 can receive a second set of documents (also referred to herein as "second set of field images"), a second set of data records (also referred to herein as "second set of filed types"), or a second set of transcriptions from a second set of data sources. The second set of documents, the second set of data records, or the second set of transcriptions can be specific to users (referred to herein as "client-specific data") of the compute device 111, but in format similar to the first set of documents, the first set of data records, or the first set of transcriptions. Processing the client-specific data on the compute device 111 remote from the compute device 101 enables the second compute device 111 to maintain confidentiality of the client-specific data.

The second compute device 111 can be configured to receive the second set of documents or the second set of transcriptions from the memory 112 or the second set of data source in response to a user of the second compute device 111 providing an indication to begin transcribing a document. The second set of data sources can include, for example, a file system, a social network, a user device, a database, and/or the like. The memory 112, the communication interface 113, and the processor 114 can be functionally and/or structurally similar to the memory 102, the communication interface 102, and the processor 104, respectively. In some instances, the second set of documents can also include a second set of field images that refer to parts of a document that contain a particular type of data such as, for example, a signature, a handwritten paragraph, an address, and/or the like. The second set of data records can include, a document creation date, a document edit date, a document dimension, a document file format, a document length, a document word count, a document character count, and/or any data that describe content of the second set of documents. The second set of data records can also include information about the first set of field images such as, for example, a field image creation date, a field image edit date, a field image dimension, a field image file format, a field image length, a field image word count, a field image character count, and/or any data that describe content of the second set of field images.

The processor 114 can include a feature extractor 115, a first trained machine learning model 116' (also referred to herein as "the text recognition model"), a second machine learning model 117 (also referred to herein as "the fine-tuned text recognition model"), a second trained machine learning model 117' (also referred to herein as "the trained fine-tuned text recognition model"), and a quality assurance program 118. The feature extractor 115, the text recognition model 116', the fine-tuned text recognition model 117, the trained fined-tuned text recognition model 117', and the quality assurance program 118 can be configured to receive the second set of documents, the second set of data records, and/or the second set of transcriptions. The feature extractor 115 and the quality assurance program 118 can be functionally and/or structurally similar to the feature extractor 105 and the quality assurance program 107, respectively. The text recognition model 116', the fine-tuned text recognition model 117, and/or the trained fine-tuned text recognition model 117' can be software stored in the memory 112 and/or executed by the processor 114. For example, a code to cause the text recognition model 116' and the trained fine-tuned text recognition model 117' to generate a transcription from a document can be stored in the memory 112 and/or executed by the processor 114. Similarly, each of the feature extractor 115, the text recognition model 116', the fined-tuned text recognition model 117, the trained fine-tuned text recognition model 117', or the quality assurance program 118 can be a hardware based device. For example, a process to cause the text recognition model 116' and the trained fine-tuned text recognition model 117' to generate transcriptions from documents can be implemented on individual integrated circuit (IC) chips.

The text recognition model 116' can be same as or significantly similar to the trained text recognition model 106'. In one implementation, the trained text recognition model 106' of the compute device 101 can be sent from the compute device 101 to the compute device 111 and be used without any modifications. In one example, the text recognition model 106 of the compute device 101 can be sent via the network 150 to the compute device 111, stored as text recognition model 116', and be used after some modification to adjust (e.g., add a procedural program to change input to the text recognition model 116') the model to the compute device 111. The text recognition model 116' can be stored in a memory such as, for example, a compact disk, a flash drive, and/or the like, and set to the compute device 111. In one example, the trained text recognition model 106' is compatible with a Linux operating system (OS) of the compute device 101 and is modified to the trained text recognition model 116' that is compatible with an Android OS of the compute device 111.

The fine-tuned text recognition model 117 can be configured to accept the second set of documents, the second set of data records, or a set of outputs of the text recognition model 116' as input, and generate the second set of transcriptions as output. The fine-tuned text recognition model 117 can be a machine learning model configured to receive the second set of documents, the second set of data records, or the set of outputs of the text recognition model 116' and be trained. In some instances, the fine-tuned text recognition model 117 can be for example a convolutional neural network model, a fully connected neural network model, a random forest, a classifier, a k-nearest neighbor model, a decision tree, and/or the like. As such, the fine-tuned text recognition model 117 can be configured to include a set of model parameters including a second set of weights, a second set of biases, and/or a second set of activation functions that once trained, can be executed to generate a second transcription from a second document and/or a second data record.

In one implementation, the fine-tuned text recognition model 117 can be a decision tree. The decision tree can be configured to receive the set of outputs of the text recognition model 116' as input. The decision tree can include at least one root node, a set of splitting, a set of decision nodes, or a set of terminal nodes. The text recognition model 116' can be configured to iteratively receive each document from the second set of documents and/or each data record from the second set of data records, and generate each output from the set of outputs. The fine-tuned text recognition model 117 can be configured to iteratively receive each output from the set of outputs. Each document from the second set of documents and/or each data record from the second set of data records is associated with a transcription from the second set of transcriptions. The output and the transcription can be compared using a second objective function (also referred to herein as the 'second cost function') to generate a second training loss. The second objective function can include, for example, a mean square error, a mean absolute error, a log cosh, a categorical crossentropy, and/or the like. The second set of model parameters can be iteratively modified and the second objective function can be executed at each iteration until the training loss converges to a predetermined training threshold (e.g. 85%, 90%, 95%, etc.).

The second set of model parameters can then be stored as a trained fine-tuned text recognition model 117'. The trained fine-tuned text recognition model 117' can be configured to generate a second transcription and a second transcription confidence score for a document and/or a data record. The second transcription confidence score indicating an automation performance better than an automation performance for the transcription confidence score. The automation performance can be based on the likelihood of the second transcription score being above a second confidence threshold. If the second transcription confidence score is larger than the second confidence threshold, the second transcription is acceptable and the transcription is fully automated and does not require supervision (e.g., human supervision). But if the second transcription confidence is smaller than the second confidence threshold, the transcription is sent to the quality assurance program 118. The trained fine-tune text recognition model 117' can be trained on client specific data of the second compute device 111 periodically (e.g., every day, once a week, once a month, etc.)

In some embodiments, the quality assurance program 118 can be a procedural program, including a series of computational steps, configured to sample a document, a data record, a transcription, and/or a transcription confidence score from the memory 112, the feature extractor 115, and/or the network 150 to generate a sampled document, a sampled data record, a sampled transcription, and/or a sampled transcription confidence score. The procedural program can be a series of instructions of a code that are executed by the processor 114. The quality assurance program 118 can be configured to display the sampled documents, the sampled data record, the sampled transcription, and/or the sampled transcription confidence score to a set of user (e.g., via a graphical user interface of the compute device 111). Each user from the set of user can validate the transcription and/or the transcription confidence score via the quality assurance program 118.

Each user from the set of users can provide a feedback via the quality assurance program 118. The set of feedbacks can be collected and processed automatically and/or manually to generate a consensus. The consensus can be in form of a ground-truth transcription (e.g., with a 100% confidence score) generated based on the sampled document, the sampled data record, the sampled transcription, and/or the sampled transcription confidence score. The ground-truth transcription is provided by set of users as opposed to transcriptions generated by the first trained machine learning model 116' and/or the second trained machine learning model 117'. The corrected transcription and/or the corrected transcription confidence score can be stored in the memory 112 or can be provided to the compute device 111. The corrected transcription and/or the corrected transcription confidence score can be used as training data to further train the trained fine-tuned text recognition model 117' to improve transcription accuracy and reliability of the compute device 111.

FIG. 2 is a flowchart illustrating a method 200 to train and use a fine tuned text recognition model (also referred to herein as the 'second trained machine learning model'), according to an embodiment. As shown in FIG. 2, the method 200 optionally includes, at step 201, receiving a first set of documents, a first set of transcriptions, and/or a first set of data records at a first compute device. The method 200 optionally includes, at step 202, preparing a first training data from the first set of documents, the first set of transcriptions, and the first set of data records, at the first compute device. The method 200 further includes, at step 203, training a first machine learning model using the first training data to generate a first trained machine learning model. The method 200 further includes, at step 204, sending the first trained machine learning model from the first compute device to a second compute device. The method 200 optionally includes, at step 205, receiving a second set of documents, a second set of transcriptions, and/or a second set of data records, at the second compute device. The method 200 optionally includes, at step 206, preparing a second training data from the second set of documents, the second set of transcriptions, and/or the second set of data records. The method 200 further includes, at step 207, training a second machine learning model based on the first trained machine learning model and the second training data to generate a second machine learning model. The method 200 further includes, at step 208, executing the first trained machine learning model and the second machine learning model to generate a transcription from a document. The method 200 is explained in greater detail below.

At 201, the first compute device receives the first set of documents (e.g., an image file of a scanned document, a portable document file (PDF) file containing typewritten and handwritten content, etc.), the first set of transcriptions (e.g., a transcription in form of a textual data, a transcription in form of a printed document, etc.), and/or the first set of data records. The first set of data records can include data related to the set of documents and/or the set of transcriptions such as, for example, a document creation date, a document edit date, a document dimension, a document file format, a document length, a document word count, a document character count, a transcription word count, a transcription character count. The first set of data records can further include confidence scores and information about field types such as, for example, a date filed type, a number field type, an address field type, a field character count, and/or the like.

At 202, the first compute device prepares the first training data from the first set of documents, the first set of transcriptions, and/or the first set of data records. Preparing the first training data can include associating between two sets of data. In one implementation, each document from the first set of documents can be associated with a transcription from the first set of transcription. In another implementation, each document from the first set of documents and each data record from the first set of data records can be associated with a transcription from the first set of transcriptions. The first set of documents, the first set of transcriptions, and/or the first set of data records can be further prepared by a feature extraction method (e.g., generated by the feature extractor 105 described above with respect to FIG. 1) to identify and extract a set of features. In one example, a set of fields is identified in a document from the first set of documents. The set of fields can include a date field, a text filed, an image field, a signature field, and/or the like. In another implementation, the first compute device prepares a set of prepared documents based on at least one of an image processing technique(s), a noise reduction technique(s), a skew correction technique(s), a normalization technique(s), a thresholding technique(s), a filtering technique(s), and/or a segmentation technique(s).

At 203, the first compute device trains a first machine learning model using the first training data to generate a first trained machine learning model (similar to the first machine learning model 106 and/or the first trained machine learning model 116' shown and described with respect to FIG. 1). The first machine learning model analyzes the first training data to generate the first set of transcriptions based on at least the first set of documents. The first trained machine learning model can be for example, a deep learning model, a convolutional neural network model, an adversarial machine learning model, an instance-based training model, a Bayesian network, a support vector machine, a random forest, a classifier, a k-nearest neighbor model, a decision tree, and/or the like. The first trained machine learning model includes a first set of model parameters including a first set of weights, a first set of biases (e.g., a set of numbers to be added during operation of the second trained machine learning model), and/or a first set of activation functions (e.g., a sigmoid function, a hyperbolic tangent function, a scaled exponential linear unit function, etc.) that once trained, can be executed to generate a first transcription and/or a first transcription confidence score from a first document and/or a first data record.

At 204, the first trained machine learning model is sent from the first compute device to the second compute device. In one example, the first trained machine learning model can be sent via a network connection (similar to the network 150 shown and described with respect to FIG. 1). In another example, the first machine learning model is sent in a memory such as, for example, a compact disk, a flash drive, and/or the like.

At 205, the second compute device receives the second set of documents, the second set of transcriptions, and/or the second set of data records. The second set of documents, the second set of transcription, and/or the second set of data records can be client-specific data that may not be accessed by the first compute device. Moreover, the second set of documents, the second set of transcription, and/or the second set of data records can be similar in format to the first set of documents, the first set of transcriptions, and/or the first set of data records. In some instances, the second set of documents, the second set of transcriptions, and/or the second set of data records are not similar in format to the first set of documents, the first set of transcriptions, and/or the first set of data records. In such instances, the second set of documents, the second set of transcriptions, and/or the second set of data records can be prepared to become similar to the first set of documents, the first set of transcriptions, and/or the first set of data records.

At 206, the second compute device prepares a second training data from the second set of documents, the second set of transcriptions, and/or the second set of data records. Preparing the second training data can include associating two sets of data. In one implementation, each document from the second set of documents can be associated with a transcription from the second set of transcription. In another implementation, each document from the second set of documents and each data record from the second set of data records can be associated with a transcription from the second set of transcriptions. The second set of documents, the second set of transcriptions, and the second set of data records can be further prepared by a feature extraction method (e.g., generated by the feature extractor 115 described above with respect to FIG. 1) to identify and extract a set of features.

At 207, the second compute device trains a second machine learning model based on the first trained machine learning model and the second training data to generate a second trained machine learning model (similar to the second trained machine learning model 117' shown and described with respect to FIG. 1). The second trained machine learning model analyzes the second training data to generate the second set of transcriptions from at least the second set of documents. The second trained machine learning model can be for example, a convolutional neural network model, a fully connected neural network model, a random forest, a classifier, a k-nearest neighbor model, a decision tree, and/or the like. The second trained machine learning model includes a second set of model parameters including a second set of weights, a second set of biases, and/or a second set of activation functions that once trained, can be executed to generate a second transcription and/or a second transcription confidence score from a second document and/or a second data record.

At 208, the second compute device executes the first trained machine learning model and the second trained machine learning model to generate a transcription and/or a transcription confidence score from a document and/or a data record. If the transcription confidence score is above a threshold, the transcription is accepted and is sent to an output such as for example, a monitor of the second compute device, a memory (such as the memory of 112 as shown and described with respect to FIG. 1), a print out of the transcription, and/or the like. If the transcription is below the threshold, the transcription can be sent to a set of users of the second compute device for human supervision to generate a corrected transcription. In some instances, the human supervision involves observing the document, the data record, the transcription, and/or the transcription confidence score. The human supervision further involves comparing the transcription with the document for transcription accuracy. The human supervision can further optionally include assessing a corrected confidence score and/or generating the corrected transcription by, for example, typing the contents of the document to a word file. The transcription, the transcription confidence score and the corrected transcription can be stored in the memory for further training of the second trained machine learning model. In some implementations, the transcription confidence score can be statistically better than the first transcription confidence score, in the sense that an automation performance of the transcription is better than an automation performance of the first transcription. In other implementations, the numerical value of transcription confidence score can be statistically higher than the numerical value of the first transcription confidence score.

Figure 3:
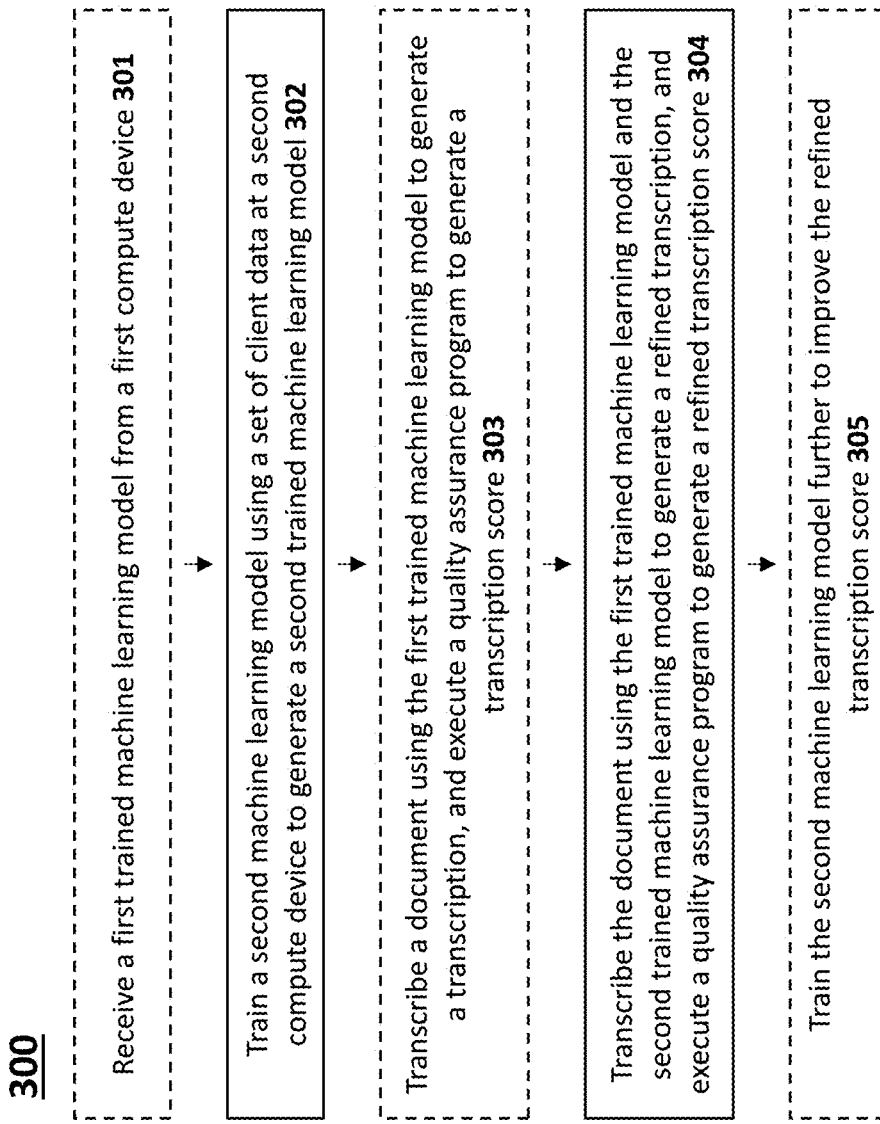
FIG. 3 is a flowchart illustrating a method to use and verify a text recognition model, according to an embodiment.

FIG. 3 is a flowchart illustrating a method 300 to use and verify a fine tuned text recognition model (also referred to herein as the "second trained machine learning model"), according to an embodiment. As shown in FIG. 3, the method 300 optionally includes, at step 301, receiving a first trained machine learning model from a first compute device. The method 300 optionally includes, at step 302, training a second machine learning model using a set of client data at a second compute device to generate a second trained machine learning model. The method 300 optionally includes, at step 303, transcribing a document using the first trained machine learning model to generate a transcription, and execute a quality assurance program to generate a transcription score. The method 300 further includes, at step 304, transcribing the document using the first trained machine learning model and the second trained machine learning model to generate a refined transcription, and execute a quality assurance program to generate a refined transcription score. The method 300 optionally includes, at step 305, training the second machine learning model further to improve the refined transcription score. The method 300 is explained in greater detail below.

At step 301, the second compute device receives a first trained machine learning model from the first compute device. The first trained machine learning model receives at least one document to generate at least one transcription. The second compute device receives the client data including a set of documents, a set of transcriptions, and/or a set of data records. The client data can be client-specific data that may not be accessed by the first compute device.

At step 302, the second compute device trains a second machine learning model using the set of client data at the second compute device to generate a second trained machine learning model (similar to the second trained machine learning model 117' shown and described with respect to FIG. 1). The second trained machine learning model analyzes the client data to generate the set of transcriptions from the set of documents and/or the set of data records. The second trained machine learning model can be for example, a convolutional neural network model, a fully connected neural network model, a random forest, a classifier, a k-nearest neighbor model, a decision tree, and/or the like. The second trained machine learning model includes a set of model parameters including a set of weights, a set of biases, and/or a set of activation functions that once trained, can be executed to generate a transcription and/or a transcription score from a document and/or a data record.

At step 303, the second compute device can optionally transcribe a document using the first trained machine learning model to generate a transcription, and execute a quality assurance program to generate a transcription score. The second compute device executes the first trained machine learning model to generate a transcription from the document. The second compute device can optionally execute the quality assurance program to generate the transcription score. If the transcription score is above a threshold, the transcription may be accepted and may be sent to an output such as, for example, a monitor of the second compute device, a memory (such as the memory of 112 as shown and described with respect to FIG. 1), a print out of the transcription, and/or the like. The threshold can be a predetermined threshold or a dynamically evaluated threshold. If the transcription score is below the threshold, the transcription may be sent to a set of users of the second compute device for human supervision to generate a first ground-truth transcription. The transcription, the transcription score, and/or the first ground-truth transcription can be stored in the memory for further trainings. The likelihood of the transcription score being above the threshold can be expressed by an automation performance of the first trained machine learning model.

At step 304, the second compute device transcribes the document using the first trained machine learning model and the second trained machine learning model to generate a refined transcription, and execute a quality assurance program to generate a refined transcription score. The second compute device executes the first trained machine learning model and the second trained machine learning model to generate a refined transcription from the document. The second compute device executes the quality assurance program to generate the refined transcription score. If the refined transcription score is above a threshold, the refined transcription may be accepted and may be sent to an output such as, for example, a monitor of the second compute device, a memory (such as the memory of 112 as shown and described with respect to FIG. 1), a print out of the refined transcription, and/or the like. If the refined transcription score is below the threshold, the transcription may be sent to the set of users of the second compute device for human supervision to generate a second ground-truth transcription. The refined transcription, the refined transcription score and the second ground-truth transcription can be stored in the memory for further trainings. The likelihood of the refined transcription score being above the threshold can be expressed by an automation performance of the second trained machine learning model. The automation performance of the second trained machine learning model indicates a better performance than an automation performance of the first trained machine learning model.

At step 305, the second compute device trains the second machine learning model further to improve the refined transcription confidence score. The second compute device uses the transcription, the transcription score, and the second ground-truth transcription to further train the second machine learning model. The second compute device uses the refined transcription, the refined transcription score and the second ground-truth transcription to further train the second machine learning model. Additionally, the second compute device can store and choose (e.g., by a user of the second compute device) to share the transcription, the transcription score, the first ground-truth transcription, the refined transcription, the refined transcription score, and/or the second ground-truth transcription, with the first compute device.

Figure 4:
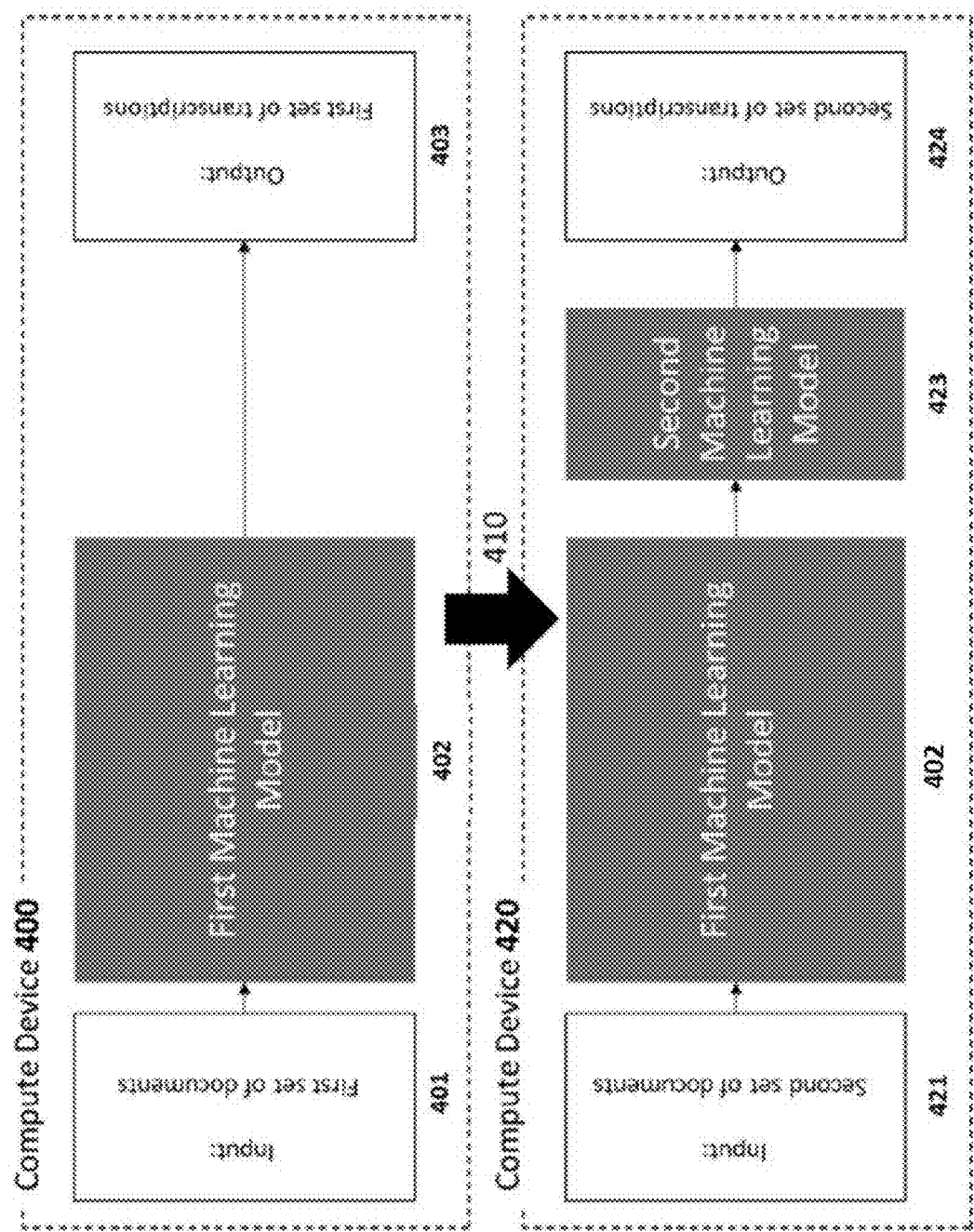
FIG. 4 is a schematic description of a text recognition model, according to an embodiment.

FIG. 4 is a schematic description of a text recognition model (also referred to herein as the "machine learning model"), according to an embodiment. A compute device 400 (structurally and functionally similar to the compute device 101 of FIG. 1), can include a first machine learning model 402 (structurally and functionally similar to the first machine learning model 106). The compute device 400 can train the first machine learning model 402 by iteratively receiving a first set of documents 401, generating a first set of transcriptions 403, and adjusting a first set of hyper parameters (e.g., a set of biases, a set of weights, a set of activation functions, etc.) of the first machine learning model 402 based on the first set of documents and the first set of transcriptions. The compute device 400 can be configured to send the first machine learning model, via transfer 410, to a compute device 420 (structurally and functionally similar to the compute device 111 of FIG. 1). The compute device 400 can transmit the first trained machine learning model 402, via a communication interface (similar to the communication interface shown and described with respect to FIG. 1), to the compute device 420.

The compute device 420 can train a second machine learning model 423 (structurally and functionally similar to the second trained machine learning model 117') by iteratively receiving a second set of documents 421, executing the first machine learning model 402, generating a second set of transcriptions 424 using the second machine learning model 423, and adjusting a second set of hyper parameters (e.g., a set of biases, a set of weights, a set of activation functions, etc.) of the second machine learning model 423 based on the second set of documents and the second set of transcriptions. The second set of documents 421 and the second set of transcription 424 can be documents and transcription from a client-specific data stored in a local database. The compute device 420 can execute the first trained machine learning model 402 and the second machine learning model 423 to perform a text recognition operation that transcribes an image of a document (e.g., an image of a form containing typewritten and handwritten content) to a transcription (e.g., a textual data) with an accuracy greater than a transcribing accuracy of the first trained machine learning model 402 alone.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
    training, at a first compute device remote from a second compute device, a first machine learning model based on a first plurality of documents and at least one of a first plurality of transcriptions or a first plurality of data records, to produce a first trained machine learning model, each document from the first plurality of documents associated with a transcription from the first plurality of transcriptions or a data record from the first plurality of data records; and
    sending the first trained machine learning model from the first compute device to the second compute device such that, during operation and after receiving the first trained machine learning model, the second compute device:
        (1) trains a second machine learning model based on the first machine learning model, a second plurality of documents, and at least one of a second plurality of transcriptions or a second plurality of data records, to produce a second trained machine learning model, each document from the second plurality of documents associated with a transcription from the second plurality of transcriptions or a data record from the second plurality of data records, and the at least one of the second plurality of transcriptions or the second plurality of data records including client-specific data accessible by the second compute device but not accessible by the first compute device; and
        (2) executes the first trained machine learning model and the second trained machine learning model to generate a second transcription from a second document, output from the first trained machine learning model being input to the second trained machine learning model, the second transcription having a second transcription confidence score that indicates a second automation performance better than a first automation performance for a first transcription confidence score, a first transcription of a first document having the first transcription confidence score when the first trained machine learning model is executed to generate the first transcription from the first document.

2. The method of claim 1, wherein the first plurality data records or the second plurality of data records include at least one of a document creation date, a document edit date, a document dimension, a document file format, a document length, a document word count, or a document character count.

3. The method of claim 1, further comprising:
    sampling at least one of (1) at least one document from the first plurality of documents, (2) at least one document from the second plurality of documents, (3) the first document, or (4) the second document, to generate a sampled data;
    generating a plurality of ground-truth transcriptions based on the sampled data; and
    generating at least one of the first transcription confidence score or the second transcription confidence score based on the sampled data and the ground-truth transcriptions.

4. The method of claim 1, wherein the first plurality of documents and the second plurality of documents include an indication of at least one of an image, a text document, a hand-written document, a table, or a webpage.

5. The method of claim 1, further comprising of:
    resizing each document from the first plurality of documents or the second plurality of documents to generate a plurality of resized documents; and
    rotating each document from the plurality of resized documents by a rotation angle to generate the first plurality of documents or the second plurality of documents.

6. The method of claim 1, wherein at least one of the first plurality of documents or the second plurality of documents include a plurality of images, the method further comprising:
    converting, before training the first machine learning model or the second machine learning model, the plurality images into a binary format based on a threshold.

7. The method of claim 1, wherein at least one of the first trained machine learning model or the second trained machine learning model is a neural network model, the neural network model having at least one convolutional layer.

8. The method of claim 1, wherein the second trained machine learning model is a decision tree.

9. An apparatus, comprising:
    a first compute device having a processor and a memory storing instructions executable by the processor to:
        (a) receive, from a second compute device remote from the first compute device, a first trained machine learning model configured to generate at least one of a first plurality of transcriptions or a first plurality of transcription confidence scores based on a first plurality of documents;

(b) train, at the first compute device, a second machine learning model based on the first machine learning model, a second plurality of documents, and at least one of a second plurality of transcriptions or a second plurality of transcription confidence scores, to produce a second trained machine learning model, the second plurality of documents and the at least one of the second plurality of transcriptions or the second plurality of transcription confidence scores being client-specific data accessible by the first compute device but not accessible by the second compute device; and (c) execute, at the first compute device, the first trained machine learning model and the second trained machine learning model to generate at least one of a transcription or a transcription confidence score from a document.

10. The apparatus of claim 9, wherein the processor is configured to:
sample at least one of (1) at least one document from the first plurality of documents, (2) at least one document from the second plurality of documents, or (3) the document to generate a sampled data;
generate a plurality of ground-truth transcriptions based the sampled data; and
generate a plurality of transcription confidence scores based on the plurality of ground-truth transcriptions and the sampled data.

11. The apparatus of claim 9, wherein the first trained machine learning model generates the at least one of the first plurality of transcriptions or the first plurality of transcription confidence scores based on the first plurality of documents and a first plurality of data records,
the second trained machine learning model generates the at least one of the transcription or the transcription confidence score from the document and a second plurality of data records,
the first plurality of data records or the second plurality of data records include at least one of a number of words count, a document creation date, a document edit date, a document dimension, a document file format, a document length, or a number of characters count.

12. The apparatus of claim 9, wherein the processor is configured to:
resize each document from the second plurality of documents to generate a plurality of resized documents; and
rotate each document from the plurality of resized documents by a rotation angle to generate at least one of the second plurality of documents or the document.

13. The apparatus of claim 9, wherein at least one of the first trained machine learning model or the second trained machine learning model is a neural network model that has at least one convolutional layer.

14. The apparatus of claim 9, wherein the second trained machine learning model is a decision tree.

15. The apparatus of claim 9, wherein the processor is configured to:
prepare a plurality of prepared documents based on at least one of an image processing technique, a noise reduction technique, a skew correction technique, a normalization technique, a thresholding technique, a filtering technique, or a segmentation technique,
the plurality of prepared documents associated with the second plurality of documents.

16. A non-transitory processor-readable medium storing code representing instructions to be executed by a processor of a first compute device, the code comprising code to cause the processor to:

(a) receive, from a second compute device remote from the first compute device, a first trained machine learning model not trained using client-specific data and configured to generate at least one transcription based on at least one document;

(b) execute the first trained machine learning model and a second trained machine learning model to generate at least one refined transcription based on the at least one transcription, the second trained machine learning model trained using client-specific data; and (c) execute a quality assurance program to generate at least one transcription score based on the at least one document and the at least one transcription;

(d) execute the quality assurance program to generate at least one refined transcription score based on the at least one refined transcription and at least one of the at least one document or the at least one transcription, the at least one refined transcription score indicating a second automation performance better than a first automation performance for the at least one transcription score, the first automation performance determined based on a likelihood generated by the first trained machine learning model, the second automation performance determined based on a likelihood generated by the second trained machine learning model.

17. The non-transitory processor-readable medium of claim 16, wherein the at least one document includes at least one of a number of words count, a document creation date, a document edit date, a document dimension, a document file format, a document length, or a number of characters count.

18. The non-transitory processor-readable medium of claim 16, wherein the quality assurance program is a procedural program, and the code further comprising code to:
sample the at least one document to generate a sampled data;
generate at least one ground-truth transcriptions based the sampled data; and
generate at least one of the at least one transcription confidence score or the at least one refined confidence score based on the ground-truth transcription and the sampled data.

19. The non-transitory processor-readable medium of claim 16, wherein at least one of the first trained machine learning model or the second trained machine learning model is a neural network model that has at least one convolutional layer.

20. The non-transitory processor-readable medium of claim 16, wherein the second trained machine learning model is a decision tree.

* * * * *